United States Patent [19]

Kelly

[11] 4,119,426
[45] Oct. 10, 1978

[54] METHOD AND APPARATUS FOR ELIMINATING TONG VENTS IN A GLASS SHEET FURNACE

[75] Inventor: Joseph B. Kelly, Crestline, Ohio

[73] Assignee: PPG Industries, Inc., Pittsburgh, Pa.

[21] Appl. No.: 830,263

[22] Filed: Sep. 2, 1977

[51] Int. Cl.² .......................................... C03B 27/02
[52] U.S. Cl. ........................................ 65/111; 65/104;
 65/114; 65/60 R; 65/273; 65/350
[58] Field of Search ................ 65/104, 106, 111, 114,
 65/118, 273, 350, 60 R

[56] References Cited
U.S. PATENT DOCUMENTS

| 3,103,429 | 9/1963 | Kruger et al. ........................ 65/152 |
| 3,293,020 | 12/1966 | Sleighter .............................. 65/111 |
| 3,295,843 | 1/1967 | McMaster et al. ..................... 263/7 |
| 3,455,722 | 7/1969 | Kushihashi ......................... 65/60 A |
| 3,744,985 | 7/1973 | Peternel .............................. 65/104 |
| 3,854,920 | 12/1974 | Kay et al. ............................ 65/106 |

Primary Examiner—Arthur D. Kellogg
Attorney, Agent, or Firm—Dennis G. Millman; Edward I. Mates

[57] ABSTRACT

In a glass sheet heating furnace where the glass sheets are supported by edge gripping tongs, means to heat the tongs independently from the heating of the glass sheets is provided so as to reduce the frequency of tong vents in the glass sheets without distorting edge portions of the glass sheets.

8 Claims, 3 Drawing Figures

METHOD AND APPARATUS FOR ELIMINATING TONG VENTS IN A GLASS SHEET FURNACE

BACKGROUND OF THE INVENTION

1. Field of the Invention

This invention relates to the thermal processing of glass sheets, and particularly to the thermal processing of glass sheets suspended by metal tongs of the self-closing type having a greater heat capacity per unit area than said glass sheets undergoing thermal processing. During thermal processing required to heat strengthen, temper, anneal, shape, and/or coat the glass sheet, it is necessary to heat the glass to above its strain point and then cool the glass sheet. Intermediate processing steps, such as shaping and/or coating, may also be performed between the heating and the cooling steps.

When glass sheets are supported in a vertical position for such thermal processing by suspension from metal tongs having a greater heat capacity per unit area than that of the glass, conventional prior art heating elements within a furnace do not heat the tongs sufficiently to enable the glass sheet in the vicinity of the tongs to develop the high temperature needed for subsequent treatment. Since the upper edge portion of the glass sheet near each vicinity gripped by tongs tends to be cooler than the remainder of the glass sheet, the glass sheet frequently develops vents in the vicinity of the region where the tongs grip the glass. Such vents cause rejects and even cause the glass to break spontaneously either during or after processing.

Attempts were made to reduce the frequency of tong vents by preheating the tongs before the tongs engaged the upper edge of glass sheets to be thermally processed. However, there are several drawbacks involved in preheating tongs in such a manner. First of all, it is difficult for operators loading glass sheets into tongs to work with hot tongs. They must use heat-insulating gloves, whose thickness makes it difficult to manipulate the tongs and/or the glass sheets undergoing processing. Furthermore, preheating the tongs prior to engaging the glass sheet is uneconomical because it wastes much heat and is imprecise because it is difficult to control the amount the tongs cool during the time interval between the preheating and the tong loading steps.

Also, the glass in the vicinity of preheated tongs may become heated to a higher temperature than the rest of the glass during the early stages of the heating cycle for the glass sheets. This initial heating may develop local distortion of the glass in the vicinity of the tongs. Such a phenomenon is called "tong pull". The amount of time as well as the temperature of the glass sheet portion in the vicinity of the tongs at the elevated temperature determines the severity of "tong pull". The localized areas of distortion that result from "tong pull" are not only out of tolerance with respect to the shape desired for the glass, but also result in optical defects or tong marks that result when the tongs penetrate deeply into the heat-softened glass. Such optical defects must be avoided in dealing with glass sheets that are fabricated into viewing windows, such as tempered side lights and back lights of automobiles, or tempered coated sheets used as windows in buildings and elsewhere.

In summation, the difficulty of using tongs to grip glass sheets for thermal processing prior to the present invention involved temperature gradients between the glass sheet portions in the vicinity of the tongs and the remainder of the glass sheets. If the tongs were too cold relative to the glass, tong vents occurred in the glass. If the tongs were too hot relative to the glass, "tong pull" and deep tong marks in the glass from deep tong penetration into the softened glass resulted.

2. Description of the Prior Art

The following patents disclose the general development of furnaces used to heat glass sheets while supported by tongs during heating.

U.S. Pat. No. 3,293,020 to Sleighter discloses a furnace for processing tong-gripped glass sheets. The furnace is provided with a series of electrical heaters 42 supported along the inner side walls 44 and 46 thereof. The voltage to each electrical heater may be controlled. However, Sleighter provides no indication as to how the voltage for individual heaters may be controlled so as to heat glass gripping tongs independently of the glass sheets.

U.S. Pat. No. 3,295,843 to McMaster discloses an enclosed furnace for heating an enlarged tong-gripped glass sheet wherein the radiating temperature of the heating elements is controlled to provide uniform temperature throughout the entire extent of the glass sheet. This patent concerns the heating of glass sheets, not the heating of tongs.

U.S. Pat. No. 3,744,985 to Peternel discloses a furnace through which glass sheets are conveyed while suspended from tongs. The furnace is sub-divided into six zones in the horizontal direction, with each zone comprising three sections arranged vertically, one above another. The input to heating elements is controlled in each of the sections of each of the zones. The heating furnace in this patent is used in conjunction with a glass shaping apparatus where the glass is press bent to shape after it leaves the furnace and means is provided to control the thermal input to preselected control zones in response to local deviations from desired shape of the press bent glass sheets. The remaining zones are programmed to be adjusted automatically in response to variations in temperature of different glass sheet regions compared to set point temperatures established for securing proper localized curvature for corresponding regions of the bent glass. No provision is made in this furnace for selectively controlling the intensity of heat supplied to heaters facing the tongs as distinguished from heaters facing the glass sheets passing through the furnace en route to the shaping station.

U.S. Pat. No. 3,854,920 to Kay et al. discloses a furnace for processing glass sheets suspended from tongs and having heating elements 23 mounted on side walls, heating elements 24 mounted on the floor and heating elements 25 mounted on the roof. Certain of these heating elements face the tongs 8 and other heating elements face the glass sheets 7. However, there is no teaching in this patent of separately controlling the heat to be applied to the tongs so as to have it different from the intensity of heat applied to the glass sheet regions remote from the tongs.

To the best of our knowledge, the prior art did not provide in a furnace for heating tong-gripped glass sheets means for independently supplying energy to heaters facing the path taken by the tongs independently of the means for providing energy to heaters facing the path taken by a glass sheet gripped by the tongs to provide simultaneously different increments of heat to the tongs and to the glass sheet during their passage through the furnace during the heating phase of thermal processing.

SUMMARY OF THE INVENTION

The present invention provides improvement in method and apparatus for the thermal processing of glass sheets suspended by metal tongs of the self-closing type having a greater heat capacity per unit area than said glass sheets, particularly in thermal processing wherein a glass sheet is heated to above the strain point of the glass and then chilled rapidly to heat strengthen the sheet. According to the present invention, the glass sheet is exposed to heat according to a given program of heat intensity from heating elements facing said glass sheet and simultaneously metal tongs are exposed to heat according to a different program of heat intensity radiated from heating elements facing said tongs. In a preferred embodiment, the intensity of the tong heating program is sufficiently greater than the intensity of the glass sheet heating program to significantly reduce the frequency of tong vents in the glass sheets. At the same time, the heat intensity applied to the tongs is not so great as to cause the glass sheet to distort locally in the vicinity of where the tongs grip the glass sheets during said thermal heating, thereby avoiding "tong pull" and deep tong penetration.

The benefits of the present invention will be understood more clearly in the light of a description of an illustrative embodiment thereof which follows.

BRIEF DESCRIPTION OF THE DRAWINGS

In the drawings which form part of a description of an illustrative embodiment and wherein like reference numbers refer to like structural elements.

DESCRIPTION OF THE PREFERRED EMBODIMENT

Figure 1:
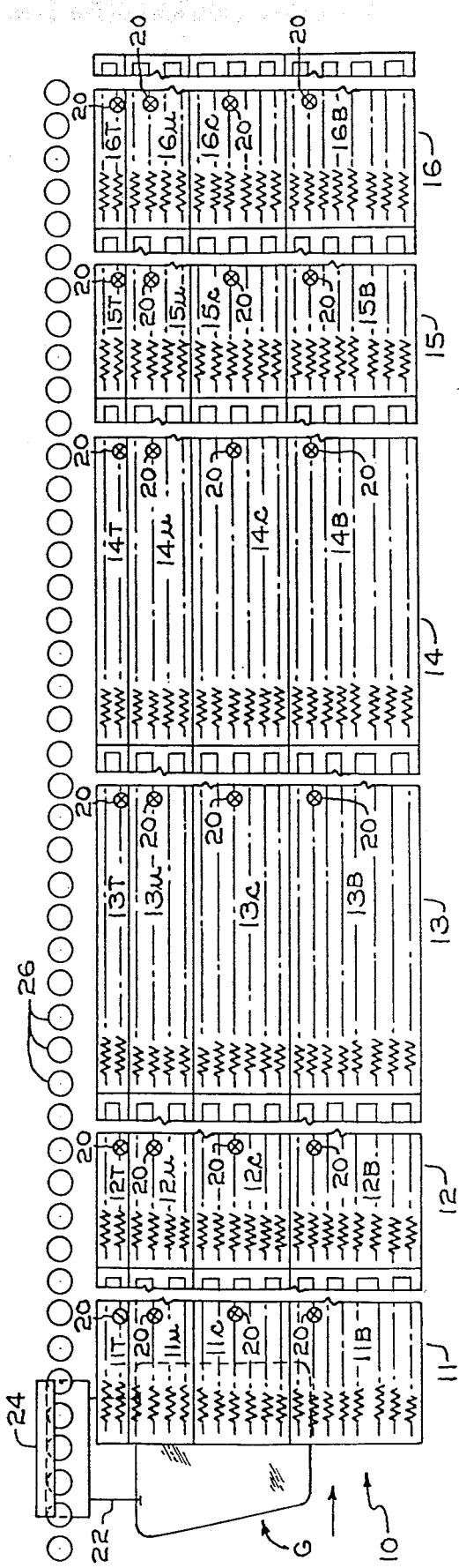
FIG. 1 is a diagrammatic longitudinal elevational view of an elongated furnace with a part of each section broken away to show certain elements more clearly, showing how the furnace is arranged in various zones and sections to provide controlled heat simultaneously to a glass sheet and glass gripping tongs in each of said zones and sections during the thermal processing of glass sheets gripped by metal tongs.

Referring to the drawings, FIG. 1 shows an elongated furnace 10 provided with six zones in the horizontal direction. Each zone comprises four sections arranged vertically of one another. The zones are numbered consecutively from 11 to 16 starting at the cold end of the furnace, which is to the left, and ending with the hot exit end of the furnace, which is to the right of the drawing. Each of the furnace zones has a tong heating section 11T to 16T, inclusive, at its uppermost portion. Immediately below is a corresponding upper glass heating section 11U to 16U, inclusive. Below each upper glass heating section is a center glass heating section 11C to 16C, inclusive. A bottom glass heating section 11B to 16B, inclusive, is located below each corresponding center glass heating section in the respective zones 11 to 16.

Furnace zones 13 and 14 are longer than the other furnace zones. The furnace zones are in end to end relation from the furnace entrance to the furnace exit so as to provide a tunnel-like opening for the movement of the glass sheets and their supporting tongs through furnace 10.

Each section of each furnace zone is provided with a thermocouple 20. The positions of the thermocouples are generally in the geographical center of one of the heating elements within the zone. Each of the heating elements is in the form of a spirally wound elongated wire, and each thermocouple is located centrally of a spiral coil in the longitudinal center of the heater within each furnace zone.

Glass sheets G are gripped by tongs 22. The latter are suspended from carriages 24, which are driven by conveyor rolls 26 supported near the furnace roof. The conveyor 26 is used to propel the carriages 24 along a path extending the length of the furnace 10 in a manner well known in the art.

According to the present invention, the tongs 22 move along a path that faces the heating elements of sections 11T, 12T, 13T, 14T, 15T and 16T so that the program of heating the tongs is determined by the voltage supplied to the various electrical heaters in the corresponding heating sections 11T to 16T of the heating zones 11 to 16 of the furnace 10. Simultaneously, the glass sheets G, whose upper edge portions are gripped by tongs 22, pass through the zones 11 to 16 with their upper portions facing the heating elements of the upper glass sheet heating sections 11U to 16U, their center portions facing the heating elements of the center glass heating sections 11C to 16C and their bottom portions simultaneously facing the heating elements of the bottom glass heating sections 11B to 16B of the furnace zones 11 to 16, respectively. In this manner, the tongs 22 and the glass sheets G can be heated independently of one another so that the portion of each glass sheet engaged by the tongs does not have its temperature modified by the heat absorbed by the relatively high heat capacity tongs (compared to the heat capacity of the adjacent glass sheet portions) to prevent the glass from attaining a temperature sufficiently high to permit good thermal processing without causing tong vents.

Figure 2:
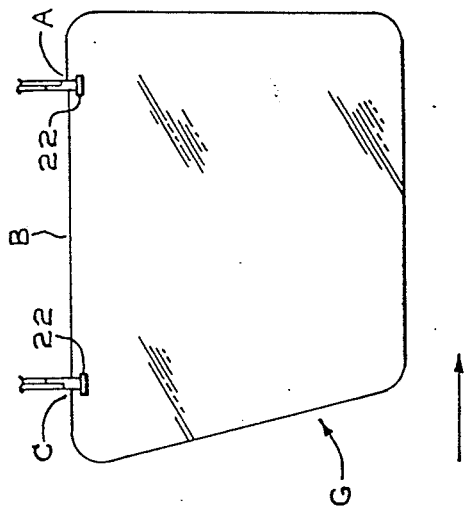
FIG. 2 is a diagrammatic sketch showing a typical glass sheet supported by tongs for temperature measurements and indicating the location of said measurements.
Figure 3:
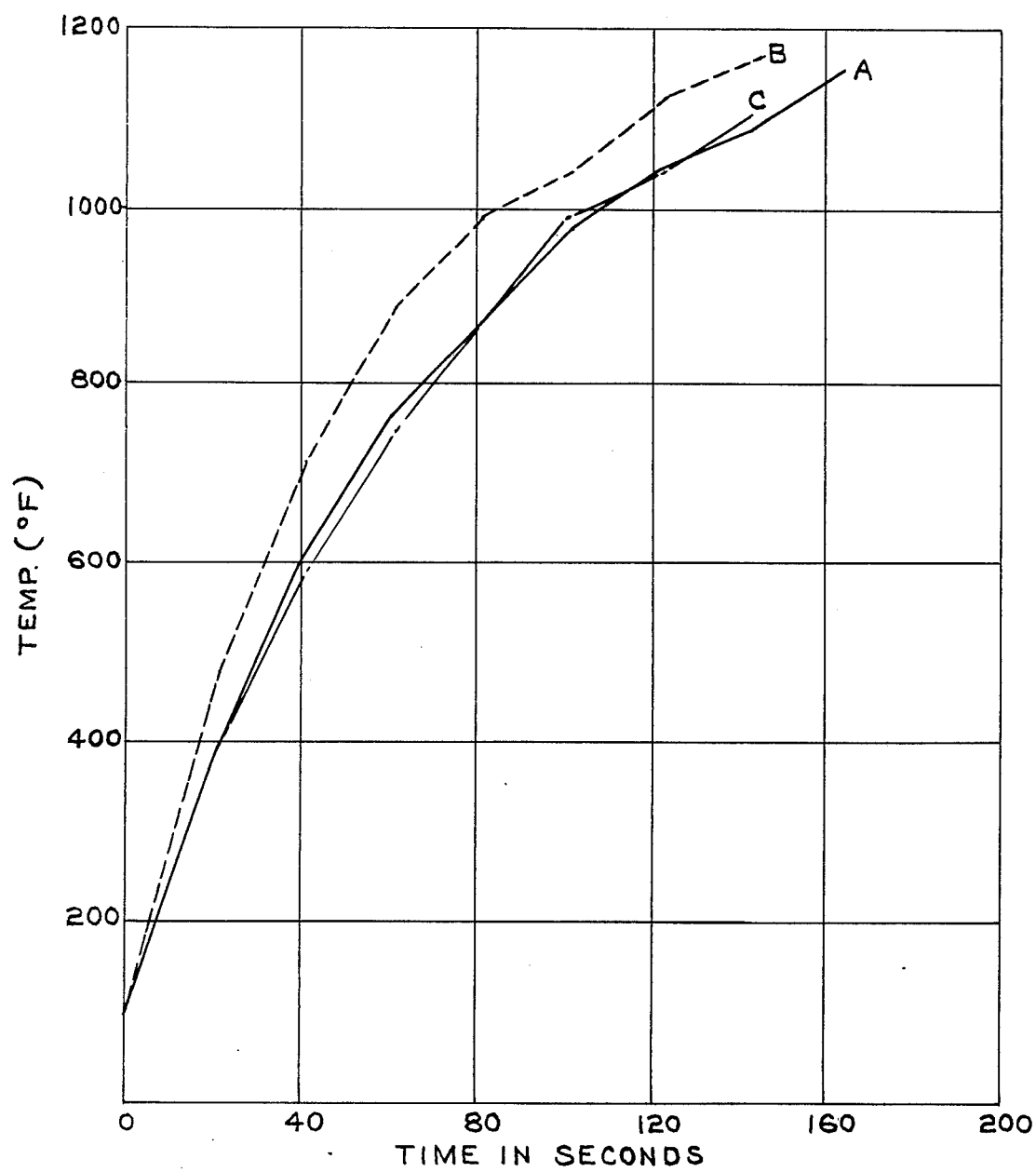
FIG. 3 is a time-temperature chart comparing the glass temperature in the vicinity of glass gripping tongs with the glass temperature along the upper edge at a position spaced from said tongs.

Prior to the present invention, each of the furnace zones 11 to 16 was provided with three sections. Thus, sections 11T and 11U of the present invention were combined as an individual section and, similarly, sections 12T and 12U of the present invention were combined as one section in zone 12, sections 13T and 13U of the present invention were combined as a single section in zone 13, sections 14T and 14U of the present invention were combined as one section in zone 14, sections 15T and 15U of the present invention were combined as one section in zone 15, and sections 16T and 16U of the present invention were combined as a single section in zone 16. With such furnace heating patterns, a glass sheet had its upper, center and bottom portions pass in facing relation to corresponding heating elements that provided different programs for heating the respective portions of the glass sheets. Prior to the present invention, if the program of heating provided by the upper heating elements in the zones was barely sufficient to bring the upper glass sheet portion to a temperature suitable for tempering, vents would occur frequently in the vicinity of the tongs. Thermal studies of the time-temperature relationship at three points along the upper edge portion were made to determine the cause of these vents. In these thermal studies as depicted in FIG. 2, tongs gripped the glass sheets G under study in the vicinity of points A and C. Thermocouples were applied to points A and C along their upper edge adjacent the tong gripping points and at another point B along the upper edge at approximately the midway point between the tong gripping points A and B. FIG. 3 shows a typical time-temperature relationship of the glass in the vicinity of the tong points A and C compared to the point B along the upper edge intermediate the tong points. The glass in the vicinity of the tong gripping points was considerably cooler than the upper glass edge at point B spaced from the tong gripping points. Sheets 5 millimeters thick of clear float glass processed in a six zone furnace with three sections per zone having the following temperature pattern produced many tong vents. The temperature pattern of Table I depicts temperature readings in degrees Fahrenheit based on thermocouple locations in the center of helical heating coils for sections 11U to 16U, 11C to 16C and 11B to 16B.

TABLE I

TEMPERATURE PATTERN IN FURNACE (PRIOR ART) (° F)

| Zone | Top Heating Section | Center Heating Section | Bottom Heating Section |
|---|---|---|---|
| 1 | 1320 | 1320 | 1340 |
| 2 | 1310 | 1310 | 1350 |
| 3 | 1360 | 1360 | 1360 |
| 4 | 1420 | 1355 | 1430 |
| 5 | 1410 | 1410 | 1420 |
| 6 | 1410 | 1430 | 1420 |

After the furnace was adjusted by providing independent heating for the tong heating section in each zone, only the first sheet of clear float glass processed showed a tong vent. Subsequently, tong vents were eliminated on a run of 25 clear float glass sheets. The modified heat pattern of the furnace operation was the same as depicted in Table I except for the additional thermocouple readings for new furnace sections 11T to 16T, which were divided out of previous sections 11U to 16U, respectively, thus lessening the height of the sections 11U to 16U to the configuration of FIG. 1. Table II shows a successful temperature pattern based on thermocouple readings at the center of helical heating coils of the sections of the modified furnace that heated sheets of clear float glass 5 millimeters thick prior to press bending and tempering. No tong vents occurred during several months of furnace operation modified by providing independent controls for tong heating elements that faced the path of tong movement.

TABLE II

MODIFIED TEMPERATURE PATTERN IN FURNACE FOR CLEAR GLASS

| Zone | Tong Heating Section | Top Glass Heating Section | Center Glass Heating Section | Bottom Glass Heating Section |
|---|---|---|---|---|
| 1 | 1380 | 1320 | 1320 | 1340 |
| 2 | 1380 | 1310 | 1310 | 1350 |
| 3 | 1410 | 1360 | 1360 | 1360 |
| 4 | 1430 | 1420 | 1355 | 1430 |
| 5 | 1415 | 1410 | 1410 | 1420 |
| 6 | 1435 | 1410 | 1430 | 1420 |

It is noted that best operations occurred when the program of heating the tongs provided higher temperatures for the heating elements facing the tongs than the program for the heating elements facing most glass sheet portions. It is particularly desirable to heat the tongs by exposing them to heating elements at a higher temperature than the heating elements facing the glass sheet during the early stages of the heating program so that in the early stages of heating, the tongs of higher heat capacity than the glass attain a temperature more closely approximating that of the glass than was possible with the prior art configuration such as evidenced in Table I.

An additional pattern for heating glass gripping tongs and glass sheets of tinted float glass supported by said tongs is depicted in TABLE III. Tong vents are not as critical a problem with tinted glass (such as SOLEX ® glass) as they are with clear glass.

TABLE III

MODIFIED TEMPERATURE PATTERN IN FURNACE FOR TINTED GLASS

| Zone | Tong Heating Section | Upper Glass Heating Section | Center Glass Heating Section | Bottom Glass Heating Section |
|---|---|---|---|---|
| 1 | 1340 | 1320 | 1320 | 1360 |
| 2 | 1350 | 1310 | 1310 | 1350 |
| 3 | 1380 | 1360 | 1340 | 1360 |
| 4 | 1420 | 1420 | 1345 | 1430 |
| 5 | 1435 | 1410 | 1395 | 1420 |
| 6 | 1435 | 1410 | 1415 | 1420 |

It is obvious from the experiments reported that vents due to tongs in the processing of glass sheets, particularly those involving press bending and tempering, as those reported in TABLES II and III, are substantially eliminated by a heating program in which the tongs are heated by exposure to heating elements radiating heat at a higher temperature than the heating elements to which the glass sheets suspended from the tongs are exposed. It is also obvious from the results of the experiments that it is possible to heat the tongs according to a different program of heating from that applied to the upper portion of glass sheets undergoing thermal processing so as to avoid overheating the glass, which causes "tong pull" and tong marks due to deep penetration of the tongs into the heat-softened glass.

In the experiments performed to develop the data for Tables II and III, the upper edge of the glass sheets passed through the furnace slightly below a horizontal plane intersecting the boundary between the heating elements for sections 11T to 16T and the heating elements for sections 11U to 16U. The main portions of the tongs 22 were facing the heating elements of sections 11T to 16T, while the small bottom portions of the tongs that engaged the glass sheets G were facing the heating elements in sections 11U to 16U. Consequently, the bottom portions of the tongs were heated by heat conduction from their main portions as well as by radiation from the heating elements. This reduced the tendency of the tongs to retard the heating of the adjacent top edge portions of the glass sheets and caused less steep thermal gradients between the tong gripped portions of the glass sheet and the glass sheet portions remote from the tongs. This phenomenon is believed to explain the prevention of tong vents in tong gripped glass sheets after the furnace was modified according to the present invention.

The form of this invention shown and described in this disclosure represents an illustrative preferred embodiment thereof. It is understood that the independent heating of glass gripping tongs according to a program of heating different from that applied to the glass sheets may be applied to any thermal processing that includes some treatment step between a heating step and a cooling step including press bending as described, as well as any other glass fabrication technique that involves thermal processing such as shaping, heat strengthening, annealing, tempering and/or coating of flat or shaped glass sheets. It is also understood that various changes in specific details of the heating programs for tongs and glass as well as other changes that become obvious in the light of this specification may be made without departing from the gist of the invention as defined in the claimed subject matter that follows.

I claim:

1. In the method of heating a glass sheet to approximately its strain point or above and then cooling the glass sheet so as to increase its strength, wherein the glass sheet is heated while being gripped along edge portions by metal tongs having a greater heat capacity than the glass sheet, the improvement comprising carrying out said heating step by supporting the glass sheet opposite a first array of heating elements while maintaining protions of the tongs extending beyond the periphery of the glass sheet opposite a second array of heating elements, no portion of the glass sheet being located directly opposite said second array of heating elements, and controlling the energy inputs to the first and second arrays of heating elements independently so as to heat at a higher average rate in the region opposite the second array than in the region opposite the first array, thereby alleviating the occurrence of tong vents arising from a temperature difference between the tongs and the glass sheet.

2. The method of claim 1 wherein said first array of heating elements includes a plurality of sections, the energy inputs to which are independently controlled.

3. The method of claim 1 wherein the glass sheet is hung vertically from the tongs and the glass sheet and the tongs are conveyed in a horizontal direction during said heating step.

4. The method of claim 1 wherein, after said heating step and prior to said cooling, the glass sheet is bent.

5. The method of claim 1 wherein, after said heating step and prior to said cooling, the glass sheet is coated.

6. An apparatus for heating glass sheets vertically hung from tongs, comprising:

a furnace having a narrow, vertically elongated heating chamber adapted to receive a vertically hanging glass sheet, arrays of heating elements along the sides of said heating chamber arranged in opposed pairs to form a plurality of heating zones, a first of said heating zones being disposed directly below a second of said heating zones, conveyor means for passing the glass sheet through said heating chamber and carrying glass-gripping tongs at an elevation where the lower, glass-gripping portions of the tongs are opposite the first heating zone while upper portions of the tongs beyond the periphery of the glass sheet are opposite the second heating zone, and means to control the rate of heating in each of the heating zones independently.

7. The apparatus of claim 6 wherein said first heating zone comprises a plurality of independently controlled sections.

8. The apparatus of claim 6 wherein the conveyor means are adapted to convey said tongs in a horizontal direction through said heating chamber.

* * * * *